(12) United States Patent  
Nekado et al.

(10) Patent No.: US 6,768,426 B2
(45) Date of Patent: Jul. 27, 2004

(54) POSITION DETECTION APPARATUS (75) Inventors: Yasuo Nekado, Kanagawa (JP); Masaaki Kusumi, Kanagawa (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 10/602,470

(22) Filed: Jun. 23, 2003

(65) Prior Publication Data

US 2004/0046679 A1 Mar. 11, 2004

(30) Foreign Application Priority Data

Jun. 28, 2002 (JP) .................................... P2002-190773

(51) Int. Cl.⁷ ............................................. H03M 1/22
(52) U.S. Cl. ............................. 341/3; 341/11; 341/15
(58) Field of Search .......................... 341/3, 10, 1, 15, 341/11, 9, 13

(56) References Cited

U.S. PATENT DOCUMENTS

| 4,470,108 A | * | 9/1984 | Kato et al. ................. 700/56 |
| 5,173,693 A | * | 12/1992 | Fry ............................ 341/15 |
| 5,438,330 A | * | 8/1995 | Yamazaki et al. ........... 341/11 |
| 6,452,159 B2 | * | 9/2002 | Holzapfel et al. ..... 250/231.13 |
| 2003/0187609 A1 | | 10/2003 | Kusumi et al. ............ 702/150 |

FOREIGN PATENT DOCUMENTS

| JP | 50-99564 | 8/1975 | ............ G08C/9/00 |
| JP | 63-177019 | 7/1988 | .......... G01D/5/249 |
| JP | 1-152314 | 6/1989 | .......... G01D/5/249 |
| JP | 2-21216 | 1/1990 | .......... G01D/5/249 |
| JP | 2-284025 | 11/1990 | .......... G01D/5/249 |
| JP | 2571393 | 10/1996 | .......... G01D/5/249 |
| JP | 2571394 | 10/1996 | .......... G01D/5/249 |
| JP | 2679207 | 8/1997 | .......... G01D/5/249 |
| JP | 9-264760 | 10/1997 | .......... G01D/5/249 |
| JP | 9-264761 | 10/1997 | .......... G01D/5/249 |
| JP | 3063044 | 5/2000 | .......... G01D/5/249 |
| JP | 3103266 | 8/2000 | .......... G01D/5/249 |

* cited by examiner

Primary Examiner—Brian Young
Assistant Examiner—John B. Nguyen
(74) Attorney, Agent, or Firm—Haverstock & Owens LLP (57) ABSTRACT A position detection apparatus including a detection unit for an absolute track including a plural number of ABS heads for absolute track, in which the separation between neighboring heads is broadened. The n ABS heads 10-1 to 10-n are arrayed to satisfy the following equations 1 and 2 when n is an even number and the following equations 1 and 3 when n is an odd number:

$$\lambda_1 = m\lambda, \text{ m being an integer not less than 2} \quad (1)$$

$$\lambda_1 \neq k(2^{n/2}+1)\lambda, \text{ k being a natural number} \quad (2)$$

$$\lambda_1 \neq k(2^n+1)\lambda \quad (3).$$

By arraying the ABS heads 10-1 to 10-n under these conditions, the separation between neighboring ones of the ABS heads 10-1 to 10-n can be 2λ or larger.

3 Claims, 11 Drawing Sheets

POSITION DETECTION APPARATUS

BACKGROUND OF THE INVENTION

1. Field of the Invention

This invention relates to a position detection apparatus, used in e.g. machine tools or industrial machines, for detecting the position which has been varied due to linear movements or rotational movements. This application claims priority of Japanese Patent Application No. 2002-190773, filed on Jun. 28, 2002, the entirety of which is incorporated by reference herein.

2. Description of Related Art

Among the position detection apparatus, used in e.g. machine tools or industrial machines, for detecting changes in the positions caused by e.g. linear movements, there are those disclosed in Japanese Laying-Open Patent Publications Nos.S50-99564, S63-177019 and H1-152314.

Figure 12:
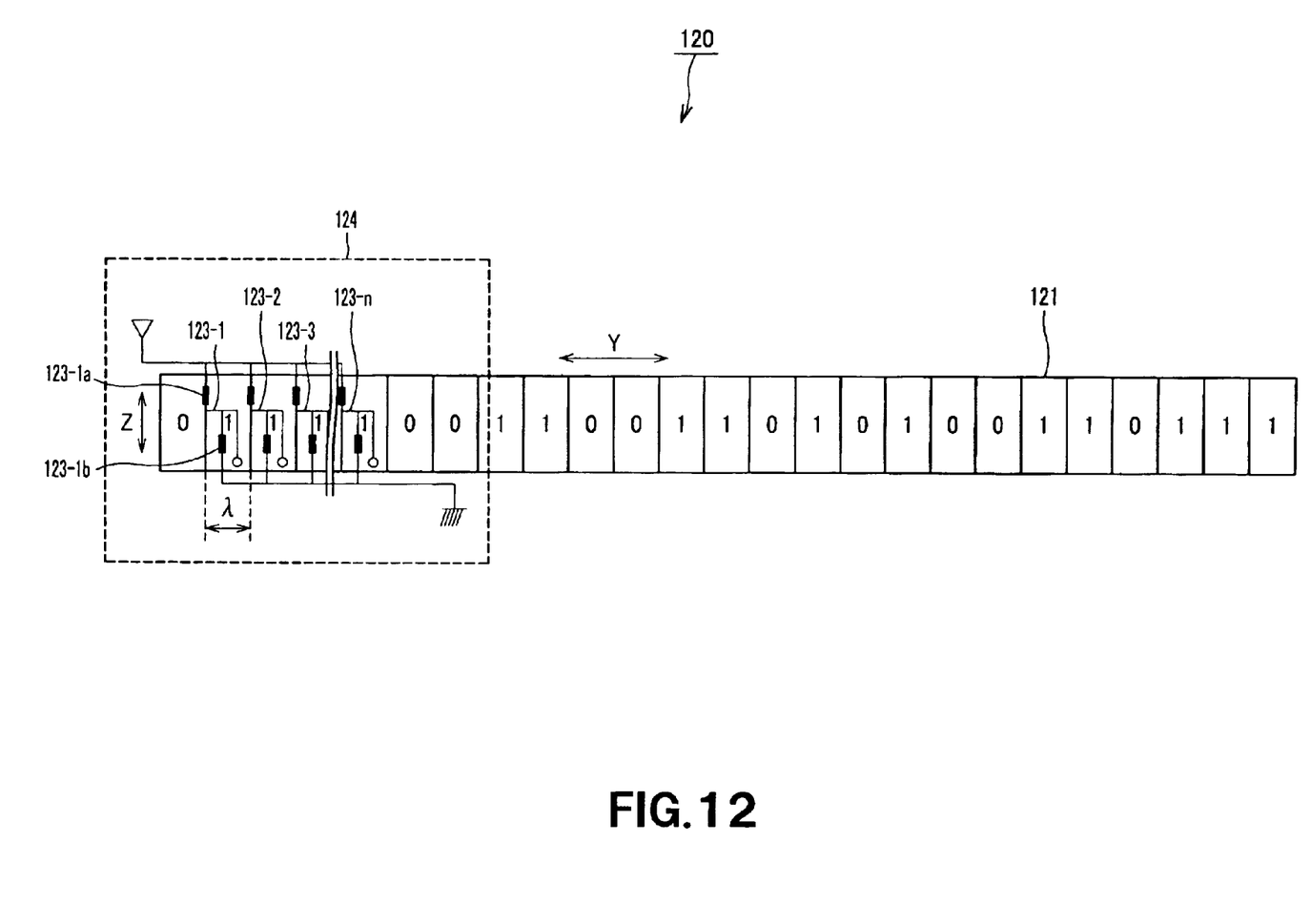
FIG. 12 is a schematic view showing a conventional position detection apparatus.

Such a position detection apparatus 120, shown in FIG. 12, includes one absolute track, referred to below as an ABS track 121, and a detection unit for the ABS track, referred to below as an ABS detection unit 124, having n heads for the absolute track, referred to below as ABS heads 123-1, 123-2, . . . , 123-n. It should be noted that the ABS heads 123-1, 123-2, . . . , 123-n, if collectively referred to, are termed ABS heads 123-1 to 123-n.

The ABS track 121 is a pattern of micro-sized areas represented by [0] and by [1], arrayed in accordance with the degree-n cyclic code. The micro-sized areas represented by [0] and by [1] differ from each other as to physical properties. For example, if the position detection apparatus 120 detects the position of the ABS detection unit 124 by exploiting the magnetism, micro-sized areas represented by [1] are magnetized, while those represented by [1] are not magnetized.

The ABS detection unit 124 is movable is movable along the longitudinal direction of the ABS track 121, indicated by arrow Y in the drawing. The ABS heads 123-1 to 123-n are provided facing the ABS track 121. Moreover, the ABS heads 123-1 to 123-n are provided at an interval λ from one another, where λ is the pitch of the micro-sized areas.

The ABS head 123-1 includes magnetizable devices 123-1a and 123-1b. The magnetizable devices may, for example, be MR devices. The ABS head 123-1 also includes a wiring and is in operation by the current flowing therein. Meanwhile, the ABS heads 123-2 to 123-n are of the same structure as the ABS head 123-1.

In the above-described position detection apparatus 120, in which the ABS track 121 is of a pattern having an array conforming to the degree n cyclic code, the n-bit codes, detected by the ABS detection unit 124, referred to below as ABS values, assume different values, as the position of the ABS detection unit 124 relative to the ABS track 121 is changed, despite the fact that the ABS track provided is one track. Thus, the position detection apparatus 120 is able to detect the position of the ABS detection unit 124 relative to the ABS track 121, based on the ABS value as detected by the ABS detection unit 124.

With the position detection apparatus 120, in which the ABS track provided is one track, it is possible to reduce the size along the width-wise direction of the ABS track 121, indicated by arrow Z in the drawing. That is, the position detection apparatus 120 can be reduced in size.

In the above-described position detection apparatus 120, there is raised a demand for higher definition and higher resolution in order to measure position changes of the ABS detection unit 124 relative to the ABS track 121 more precisely. Among the methods for further improving the definition and the resolution, there is a method for decreasing the pitch of the micro-sized areas. When the pitch of the micro-sized areas is reduced, it becomes necessary to diminish the gap between the ABS heads 123-1 to 123-n.

Figure 13:
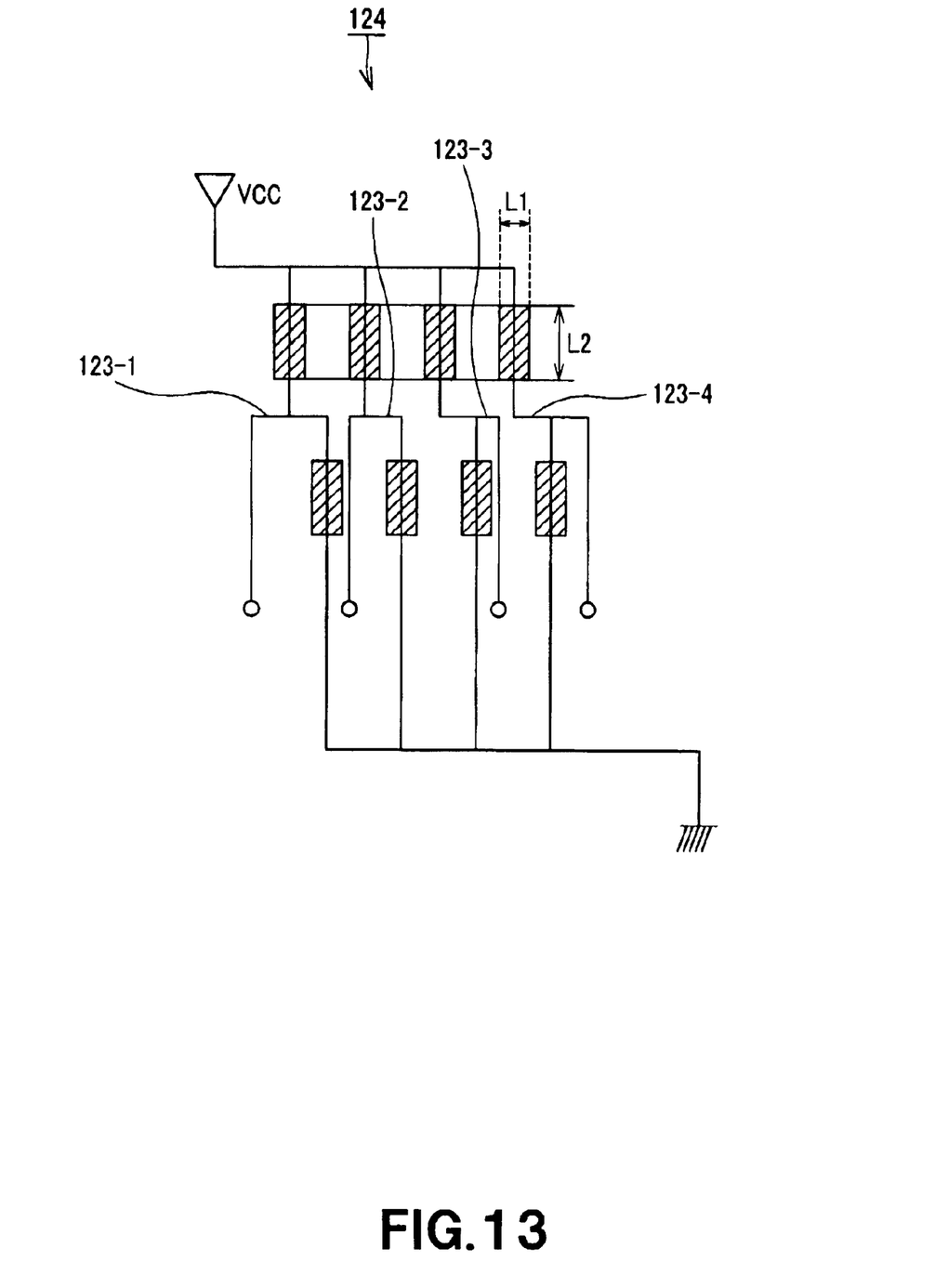
FIG. 13 is a schematic view showing an ABS detection unit provided to the position detection apparatus.

However, when the gap between the ABS heads 123-1 to 123-n is diminished, the ABS heads 123-1 to 123-n need to be arranged congested. When the ABS heads 123-1 to 123-n are arranged congested, the state of FIG. 13 results for n=4, as an example, as a result of which the magnetizable devices 123-1a to 123-4a and 123-1b to 123-4b, provided to the ABS heads 123-1 to 123-4, are congested.

The ABS heads 123-1 to 123-n are in operation by the current flowing therein. For example, the respective ABS heads 123-1 to 123-n are determined to be facing the micro-sized areas represented by [1] or the micro-sized areas represented by [0] by measuring the resistance values thereof. That is, the current flows in the respective ABS heads 123-1 to 123-n.

Thus, when the ABS heads 123-1 to 123-n are congested, the intensity of the current flowing per unit area is increased in an area of high degree of congestion of the magnetizable devices provided to the ABS heads 123-1 to 123-n, with the result that the heat evolution in the area is increased. If, in the area of high degree of congestion of the magnetizable devices provided to the ABS heads 123-1 to 123-n, the amount of heat evolution per unit area is increased, the ABS heads 123-1 to 123-n are deteriorated in characteristics, or are destroyed.

Moreover, if the ABS heads 123-1 to 123-n are congested, the wiring provided to these ABS heads 123-1 to 123-n is concentrated, with the result that the wiring needs to be reduced in diameter, thus increasing the possibility of line breakage or the current leaking to the neighboring ABS heads.

If the ABS heads 123-1 to 123-n are deteriorated in characteristics or destroyed, or if line breakage of the wiring or the current leakage to the neighboring ABS heads occurs, the possibility of malfunctioning of the position detection apparatus 120 increases, and hence the position detection apparatus 120 is deteriorated in operational reliability.

SUMMARY OF THE INVENTION

In view of the above depicted status of the art, it is an object of the present invention to provide a position detection apparatus in which, when the pitch of the micro-sized areas is diminished to improve the definition and resolution, it is possible to realize high operational reliability.

The present invention provides a position detection apparatus comprising an absolute track composed of a string of a number of micro-sized areas each indicated by a code of [0] and a number of micro-sized areas each indicated by a code of [1] in accordance with a maximum length sequence generated by a degree-n primitive polynominal, n being a natural number not less than 2, and a detection unit for the absolute track movable relative to the absolute track, the detection unit including n heads for the absolute track, arrayed facing the absolute track, for detecting the physical properties of the absolute track. The micro-sized areas each indicated by a code of [1] differ in physical properties from the micro-sized areas each indicated by a code of [0]. The n heads for the absolute track are arrayed under a condition satisfying the equations 1 and 2 if n is an even number and under a condition satisfying the equations 1 and 3 if n is an odd number:

$$\lambda_1 = m\lambda, \text{ m being an integer not less than 2} \quad (1)$$

$$\lambda_1 \neq k(2^{n/2}+1)\lambda, \text{ k being a natural number} \quad (2)$$

$$\lambda_1 \neq k(2^n+1)\lambda \quad (3)$$

where $\lambda$ is a pitch of the micro-sized areas and $\lambda_1$ is the separation between neighboring ones of the n heads for the absolute track.

With the position detection apparatus, the n ABS heads are arranged under the conditions satisfying the equations (1) and (2) or under the conditions satisfying the equations (1) and (3) when n is even or odd, respectively. By arraying the n ABS heads under these conditions, the separation between neighboring ones of the ABS heads in the position detection apparatus of the present invention can be $2\lambda$ or larger.

With the position detection apparatus, in which the separation $\lambda_1$ of the heads for the absolute track (ABS heads) may be set to $2\lambda$ or larger, it becomes unnecessary to reduce $\lambda_1$ even when the pitch of the micro-sized areas is reduced with a view to achieving high definition and high resolution.

Thus, with the position detection apparatus, in which pitch of the micro-sized areas is reduced, there is no risk of congestion of the n heads for the absolute track.

Since the n heads for the absolute track are not congested, it is possible with the position detection apparatus to reduce heat evolution from the area of congestion of the n heads for the absolute track.

Moreover, since the n heads for the absolute track are not congested, there is no risk of the wiring provided to the respective heads for the absolute track becoming congested in a preset area.

Since the wiring provided to the respective heads for the absolute track are not congested in a preset area, it is possible with the position detection apparatus to prevent the wiring provided to the respective heads for the absolute track from becoming complex, thus assuring facilitated designing of the detection unit for the absolute track.

Additionally, since the wiring provided to the respective heads for the absolute track are not congested in a preset area, it is possible with the position detection apparatus to use thick wiring. Since the thick wiring may be used for the heads for the absolute track, it is possible with the position detection apparatus to prevent the rupture of the wiring breakage or current leakage to the neighboring heads for the absolute track.

Thus, the present position detection apparatus is improved in operational reliability.

DESCRIPTION OF THE PREFERRED EMBODIMENTS

Referring to the drawings, preferred embodiments of the present invention will be explained in detail.

A first embodiment of the present invention is now explained.

Figure 1:
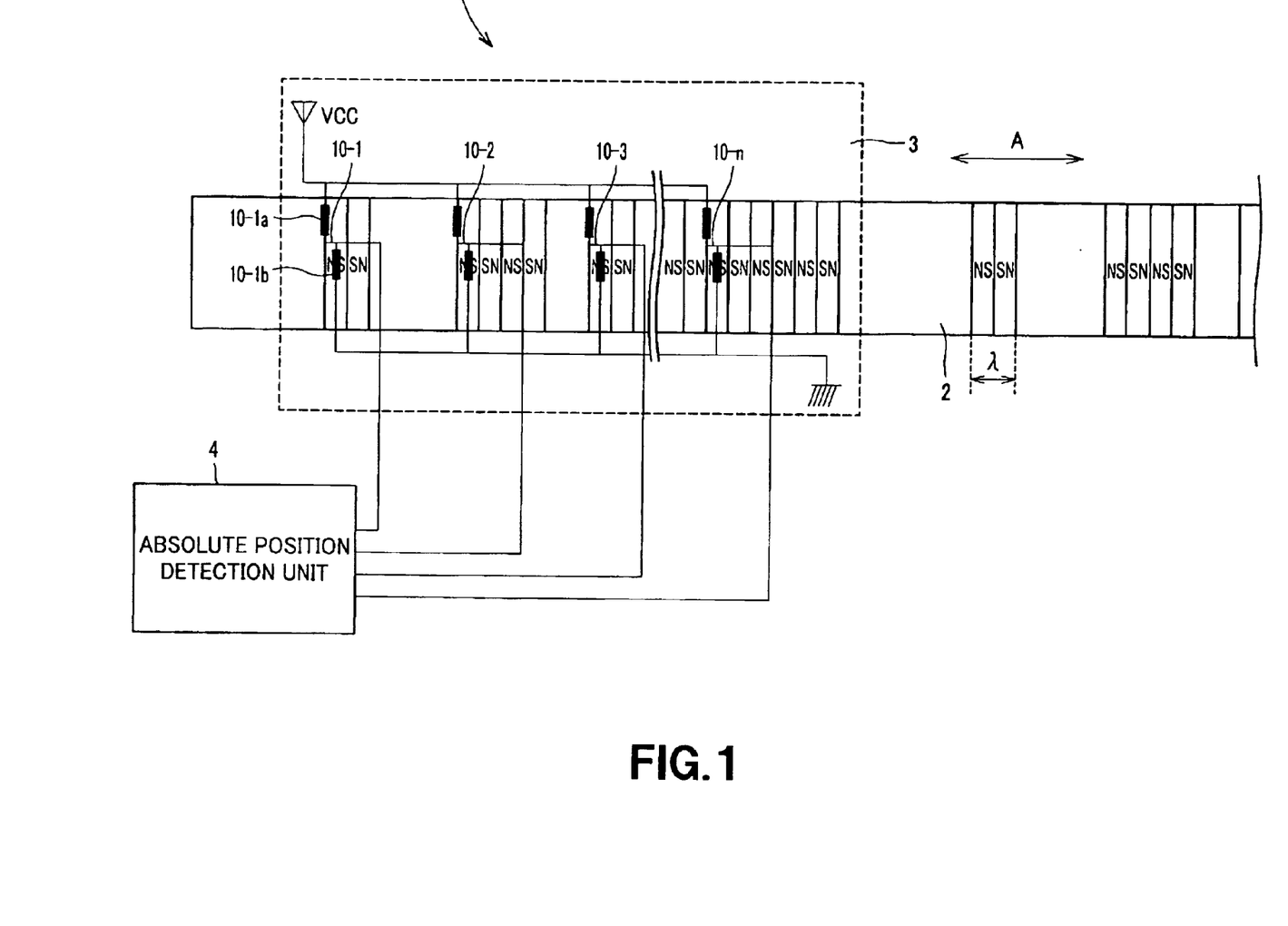
FIG. 1 is a schematic view showing a position detection apparatus embodying the present invention.

Referring to FIG. 1, a position detection apparatus 1, embodying the present invention, includes an absolute track, referred to below as an ABS track 2, a detection unit for the ABS track, referred to below as an ABS detection unit 3, and an absolute position detection unit 4.

The ABS track 2 is of a pattern in which the micro-sized areas represented by [0] and the micro-sized areas represented by [1] are arrayed in accordance with the maximum length sequence generated by the degree n primitive polynominal. The pitch of the micro-sized areas is $\lambda$. Additionally, n=4 in the present embodiment.

In the ABS track 2 of the present embodiment, the micro-sized areas represented by [0], referred to below as [0] areas, are non-magnetized, while the micro-sized areas represented by [1], referred to below as [1] areas, are magnetized. Moreover, in the present embodiment, the [1] areas are magnetized so that N→S and S→N from one boundary line to the other neighboring boundary line to the next micro-sized area, as shown in FIG. 1.

The ABS detection unit 3 detects an n-bit code from the ABS track 2. In the following, the n-bit code, detected by the ABS detection unit 3, is termed an ABS value. The ABS detection unit 3 is mounted for movement along the longitudinal direction of the ABS track 2, indicated by arrow A in the drawing. The ABS detection unit 3 includes n ABS heads 10-1, 10-2, ..., 10-n, collectively termed herein ABS heads 10-1 to 10-n.

The ABS head 10-1 includes magnetizable devices 10-1a, 10-1b. The magnetizable devices 10-1a, 10-1b may for example be MR devices. The ABS head 10-1 includes a wiring and operates by the current flowing in the wiring. Meanwhile, the ABS heads 10-2 to 10-n are of the same structure as the ABS head 10-1.

With the separation $\lambda_1$ from the neighboring head, the n ABS heads 10-1 to 10-n are arrayed under a condition satisfying the following equations 1 and 2 if n is an even number, or under a condition satisfying the following equations 1 and 3 if n is an odd number:

$$\lambda_1 = m\lambda, \text{ m being an integer not less than 2} \quad (1)$$

$$\lambda_1 \neq k(2^{n/2}+1)\lambda, \text{ k being a natural number} \quad (2)$$

$$\lambda_1 \neq k(2^n+1)\lambda \quad (3)$$

By arraying the ABS heads 10-1 to 10-$n$ under the conditions as described above, it is possible to set the separation A, between the ABS heads to not less than 2λ. By changing the value of k, $\lambda_1$ can be increased further. That is, with $\lambda_1$ being as defined by the above conditions, the separation between the ABS heads can be broader even if λ is small. The reason why the ABS heads 10-1 to 10-$n$ are arrayed under the conditions as described above will be discussed in detail subsequently.

The n ABS heads 10-1 to 10-$n$ are arrayed in a row along the longitudinal direction of the ABS track 2. Additionally, the n ABS heads 10-1 to 10-$n$ are arrayed with the respective detection surfaces not contacting the ABS track 2.

When facing the [1] areas, the n ABS heads 10-1 to 10-$n$ output signals indicating a theoretical value [1], referred to below as [1] signal. When facing the [0] areas, the n ABS heads 10-1 to 10-$n$ output signals indicating a theoretical value [0], referred to below as [0] signal. By sensing the information from the ABS track 2, the n ABS heads 10-1 to 10-$n$ detect the codes of the respective bits in the ABS value.

Figure 2:
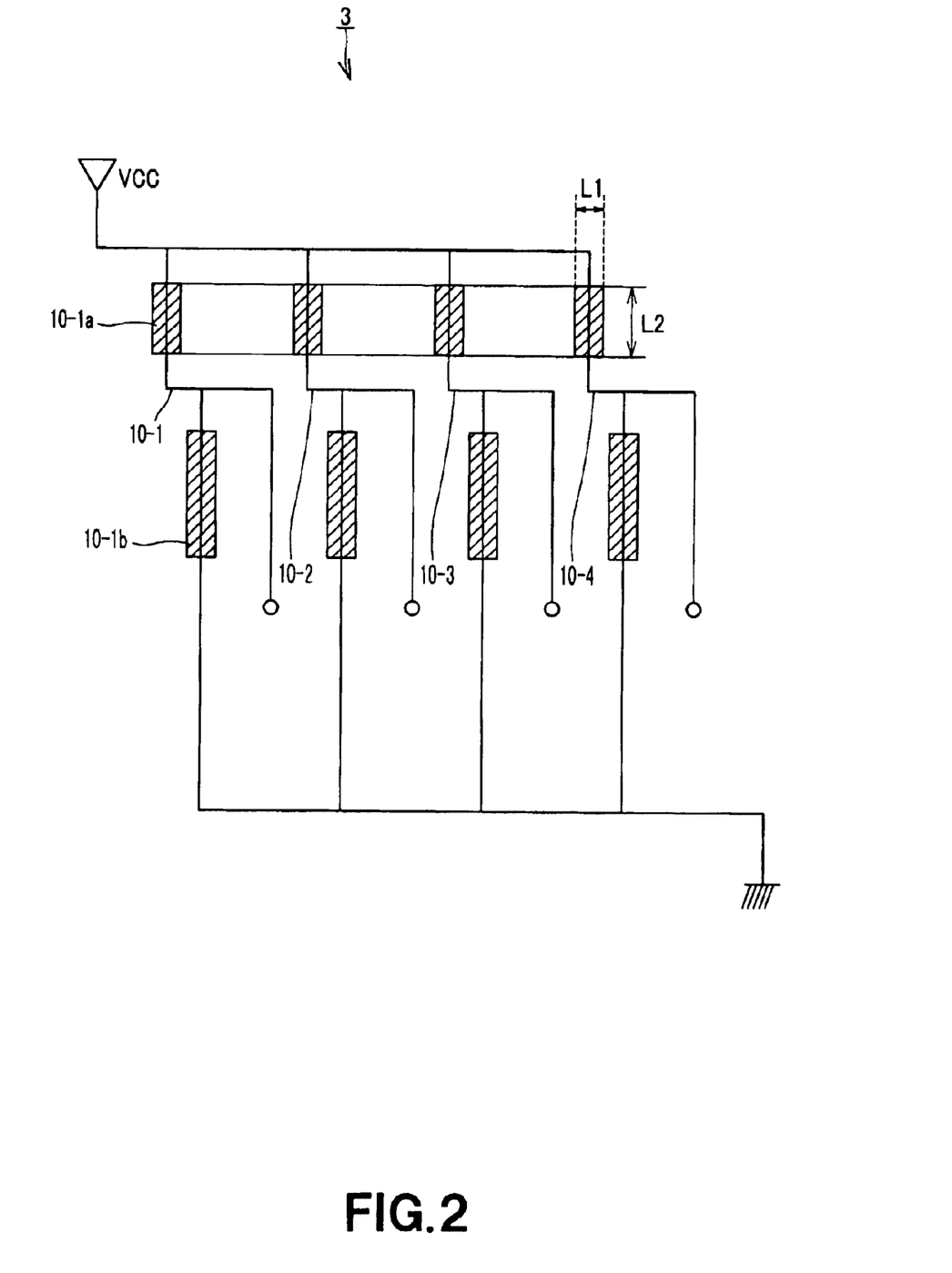
FIG. 2 is a schematic view showing an ABS detection unit provided to the position detection apparatus.

In the present embodiment, n=4, such that the ABS detection unit 3 includes an ABS head 10-1, an ABS head 10-2, an ABS head 10-3 and an ABS head 10-4, as shown in FIG. 2.

Moreover, in the present embodiment, the ABS heads 10-1 to 104 are arranged in position relationships such that $\lambda_1 = 3\lambda$. That is, these ABS heads are arrayed in the position relationships satisfying the equations (1) and (2), with k=1.

Based on the ABS values, detected by the ABS detection unit 3, the absolute position detection unit 4 detects the position of the ABS detection unit 3 with respect to the ABS track 2. The absolute position detection unit 4 includes a ROM (read-only memory), not shown. This ROM has stored therein data showing the relationship between the ABS value as detected by the ABS detection unit 3 and the absolute position domain signal indicating the position of the ABS detection unit 3 relative to the ABS track 2 in terms of domains. Based on data stored in the ROM, the absolute position detection unit 4 detects the position of the ABS detection unit 3 with respect to the ABS track 2, from the ABS value as detected by the ABS detection unit 3.

The conditions for the separation $\lambda_1$ between the ABS heads 10-1 to 10-$n$, provided to the ABS detection unit 3, are now explained in detail.

In the position detection apparatus 1, the ABS track 2 is of a pattern in which the [0] areas and the [1] areas are arrayed in accordance with the maximum length sequence generated by the degree-n primitive polynominal.

Thus, in detecting the n-bit code from the ABS track 2, the ABS detection unit 3 is able to detect different $2^n-1$ codes in succession by shifting the neighboring n bits by one bit each time.

However, the maximum length sequence is the degree n cyclic code, so that, if the ABS detection unit 3 in detecting the n-bit code from the ABS track 2 sequentially detects the code as the n bits spaced x bits, where x=m−1, are shifted by one bit, it does not occur that all $2^n-1$ codes, detected in succession, are different from one another.

Thus, the present inventors have scrutinized into the separation λ1 between the ABS heads 10-1 to 10-$n$, as now explained, and have found out the conditions. In the following, the condition for the separation λ1 of the ABS heads 10-1 to 10-$n$ is explained with reference to FIGS. 3 and 4, in which the ABS track 2 and the ABS heads 10-1 to 10-4 are schematically shown. Moreover, in FIGS. 3 and 4, the [1] areas and the [0] areas are indicated by [1] and [0], respectively.

Figure 3:
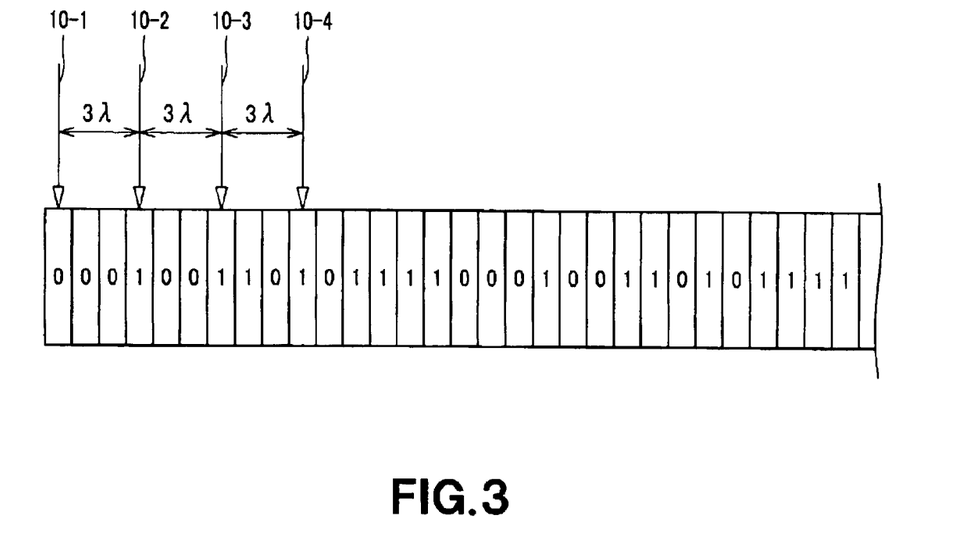
FIG. 3 is a schematic view showing the relationship between an ABS track and an ABS head when $\lambda_1 = 3\lambda$.

If, with n=4 and $\lambda_1=3\lambda$, the ABS detection unit 3 sequentially detects the $2^4-1$ 4-bit codes, from the ABS track 2, as shown in FIG. 3, these codes are detected in the sequence of [0111, 0010, 0001, 1111, 0101, 0011, 1110, 1010, 0110, 1101, 0100, 1100, 1011, 1001, 1000].

Figure 4:
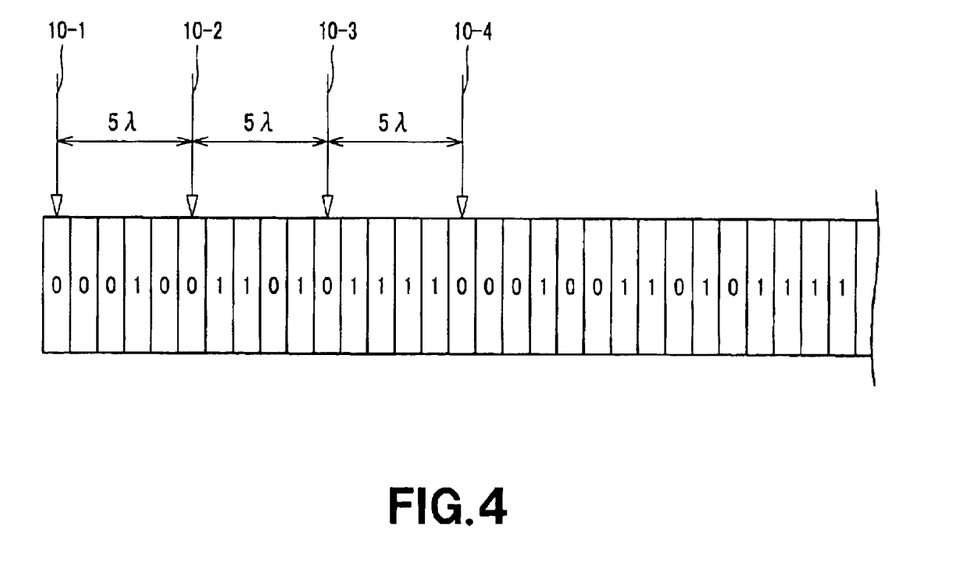
FIG. 4 is a schematic view showing the relationship between an ABS track and an ABS head when $\lambda_1 = 5\lambda$.

If, with n=4 and $\lambda_1=5\lambda$, the ABS detection unit 3 sequentially detects the $2^4-1$ 4-bit codes, from the ABS track 2, as shown in FIG. 4, these codes are detected in the sequence of [0000, 0110, 0110, 1011, 0110, 0000, 1101, 1101, 0110, 1101, 0000, 1011, 1011, 1101, 1011].

Thus, with $\lambda_1=3\lambda$, the $2^n-1$ codes, detected by the ABS detection unit 3 in succession from the ABS track 2, are all different, however, with $\lambda_1=5\lambda$, certain ones of the $2^n-1$ codes, detected by the ABS detection unit 3 in succession from the ABS track 2, are the same codes.

If the codes detected by the ABS detection unit 3 with $\lambda_1=3\lambda$ are compared to the codes detected by the ABS detection unit 3 with $\lambda_1=5\lambda$, it is seen that [0000] is detected when $\lambda_1=5\lambda$. It is known that [0000] does not present itself in the maximum length sequence generated by the degree four primitive polynominal. It is also known that, if [0000] is an initial value, the maximum length sequence cannot be generated by the degree four primitive polynominal.

From the above fact, the present inventors have presumed that if a code in which all n bits are [0] is included in the codes detected by the ABS detection unit 3 from the ABS track 2, the same code(s) are contained in the $2^n-1$ codes detected in succession.

So, the present inventors have conducted scrutinies as the value of m in the equation (1) is varied, and have found that, when the ABS heads are arrayed under the condition satisfying the relationship shown by the following equation (5):

$$\lambda_1 = 5k\lambda \quad (5)$$

the ABS detection unit 3 detects [0000].

Moreover, the present inventors have conducted scrutinies as the value of n is varied, and have found that, when the ABS heads 10-1 to 10-$n$ are arrayed under such conditions in which, when n is an even number or an odd number, the relationship shown by the equations (6) or (7):

$$\lambda_1 = k(2^{n/2}+1)\lambda \quad (6)$$

$$\lambda_1 = k(2^n+1)\lambda \quad (7)$$

respectively, is met, such a code in which n bits are all [0] is detected by the ABS detection unit 3.

From the results of the above scrutinies, it is seen that, by arraying the ABS heads 10-1 to 10-$n$ so that, when n is an even number, the relationship shown by the equations (1) and (2) are met and, when n is an odd number, the relationship shown by the equations (1) and (3) are met, the $2^n-1$ codes detected by the ABS detection unit 3 from the ABS track 2 are all different.

It should be noted that, for arraying the n ABS heads 10-1 to 10-$n$ under the conditions as described above, the length Lt of the ABS track 2 desirably satisfies the following equation (4):

$$Lt \geq (2^n-1)\lambda + (n-1)\lambda_1 \quad (4)$$

Since λ1 is set for satisfying the equation (1), the micro-sized areas, detected by the ABS head 10-1 and the ABS head 10-$n$, arrayed at both extreme ends of the ABS detection unit 3, are spaced apart by m(n−1) from each other. On the other hand, one period of the maximum length sequence is formed by $2^n$+n−2 micro-sized areas. That is, despite the fact that, when the ABS track 2 is formed by the micro-sized areas corresponding to one period of the maximum length sequence, $2^n$−1 n-bit codes can be detected from one period of the maximum length sequence, it is only possible with the ABS detection unit 3 to detect $2^n$+n−m(n−1)−1 codes from the ABS track 2.

Figure 5:
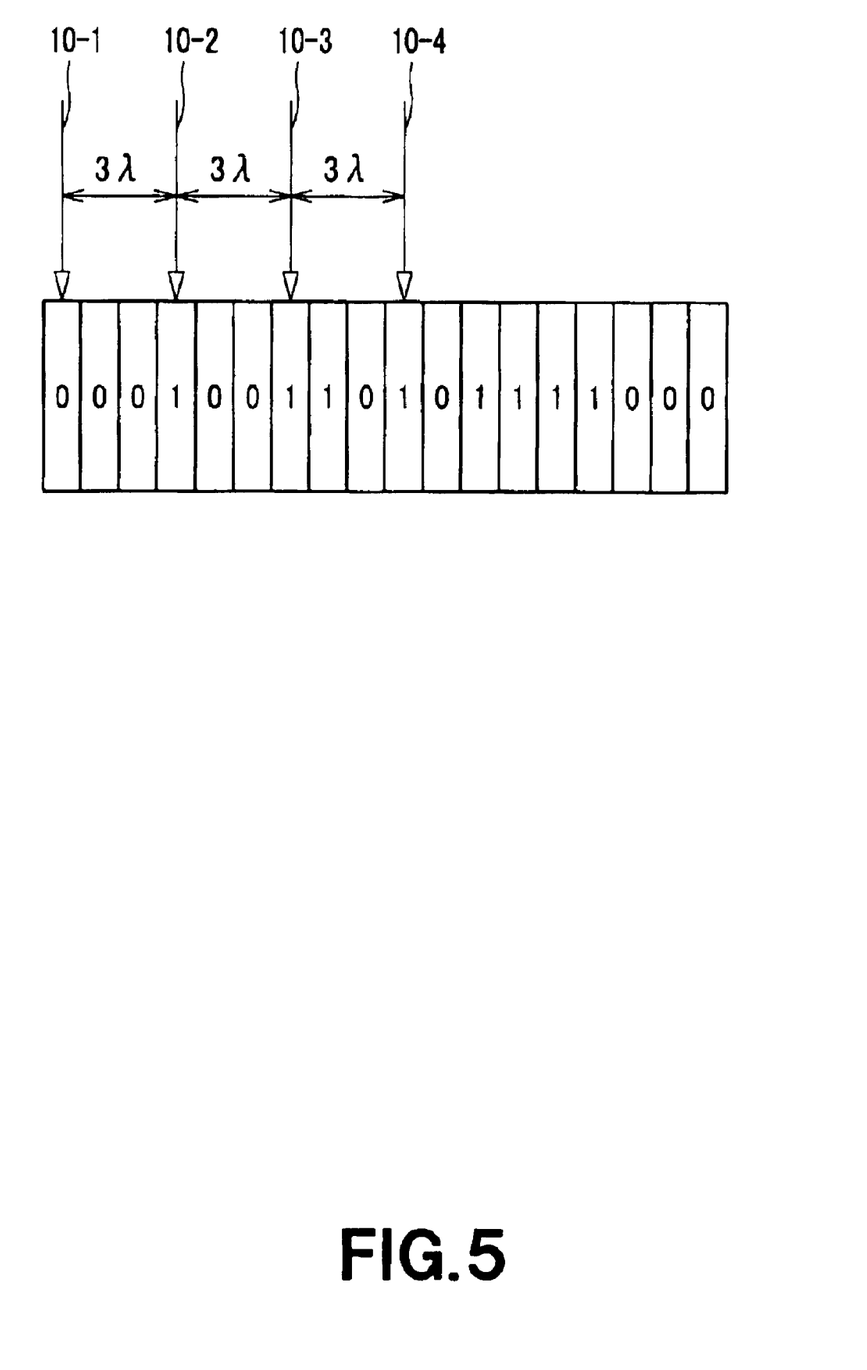
FIG. 5 is a schematic view illustrating that, when a 4-bit code is to be detected from the ABS track formed by the micro-sized areas corresponding to one period of the maximum length sequence by an ABS detection unit with $\lambda_1 = 3\lambda$ and n=4, 15 codes cannot be detected.

For example, if, with n=4 and $\lambda_1$=3$\lambda$, the ABS track 2 is formed by one period of the maximum length sequence, only 9 4-bit codes can be detected from the ABS track 2, as shown in FIG. 5, so that it is impossible to detect 15 4-bit codes.

In order for the ABS detection unit 3 to be able to detect $2^n$−1 codes, the length of the ABS track 2 needs to be equal to the length of $2^n$−1 micro-sized areas added by at least the length between the ABS head 10-1 and the ABS head 10-$n$. The length of the $2^n$−1 micro-sized areas is ($2^n$−1)$\lambda$, while the length between the ABS head 10-1 and the ABS head 10-$n$ is (n−1)$\lambda_1$. By the reason as described above, the length Lt of the ABS track 2 desirably satisfies the equation (4).

With the position detection apparatus 1, as described above, the separation $\lambda$1 of the ABS heads may be 2$\lambda$ or larger by arraying the n ABS heads 10-1 to 10-$n$ so that, when n is an even number, the equations (1) and (2) are met and, when n is an odd number, the equations (1) and (3) are met. That is, with the position detection apparatus 1, it is unnecessary to make $\lambda_1$ small when $\lambda$ is made small for improving the definition and the resolution.

Thus, with the position detection apparatus 1, there is no risk of the n ABS heads 10-1 to 10-$n$ becoming congested as a result of reducing the value of $\lambda$.

Since the n ABS heads 10-1 to 10-$n$ are not congested, it is possible with the position detection apparatus 1 to avoid the congestion of the magnetizable devices provided to the ABS heads 10-1 to 10-$n$. Thus, it is possible to diminish the risk of deterioration in characteristics or of destruction of the ABS heads 10-1 to 10-$n$ due to heat evolution from the congested area of the magnetizable devices.

Meanwhile, the relationship between the amount of heat evolution $H_1$ of the area of the position detection apparatus 1 where the magnetizable devices are congested and the amount of heat evolution $H_2$ of the area of the position detection apparatus 1 where the magnetizable devices are arranged in the position detection apparatus with the separation between the ABS heads equal to $\lambda$ is as indicated by the following equation (8):

$$H_1=[\{L_1+(n-1)\lambda\}/\{L_1+(n-1)\lambda_1\}]H_2 \quad (8).$$

From the equation (8), it is seen that, in the area of the position detection apparatus 1 where the magnetizable devices are arranged, the amount of heat evolution is decreased in inverse proportion to the distance $\lambda_1$, between the ABS heads 10-1 to 10-$n$.

Moreover, with the position detection apparatus 1, in which the ABS heads 10-1 to 10-$n$ are not congested, the wiring provided to the ABS heads 10-1 to 10-$n$ is not congested in a preset area.

With the position detection apparatus 1, in which the wiring is not concentrated to the preset area, it is possible to prevent the wiring from becoming complex to facilitate the designing of the ABS detection unit 3.

In addition, since the wiring is not concentrated to the preset area, it is possible to increase the diameter of the wiring even if $\lambda$ is small with the position detection apparatus 1. By increasing the diameter of the wiring, it is possible to prevent breakage of the wiring or the current leakage to the neighboring ABS heads.

By the above-described reason, the position detection apparatus 1 is not liable to malfunctions to increase the operational reliability.

With the ABS track 2, there is produced an area in the vicinity of each micro-sized area affected by the neighboring micro-sized area. In the following, the area affected by the neighboring micro-sized area is termed a non-stabilized area, while the area not affected by the neighboring micro-sized area is termed a stabilized area.

If the ABS heads 10-1 to 10-$n$ are present in the non-stabilized area in the vicinity of the boundary between the area [1] and the area [0], the ABS heads are affected by the neighboring micro-sized areas, so that, in these ABS heads, the output becomes unstable. Thus, with the ABS heads 10-1 to 10-$n$, it becomes difficult to output definite [1] or [0] signals.

Consequently, when the ABS heads 10-1 to 10-$n$ are present in the non-stabilized area, it becomes difficult with the ABS detection unit 3 to detect the n-bit code accurately, with the result that it becomes impossible to detect the position of the ABS detection unit 3 with respect to the ABS track 2.

A second embodiment of the present invention, in which the position of the ABS detection unit 3 relative to the ABS track 2 can be detected even when the respective ABS heads 10-1 to 10-$n$ are present in the non-stabilized area, is hereinafter explained.

Figure 6:
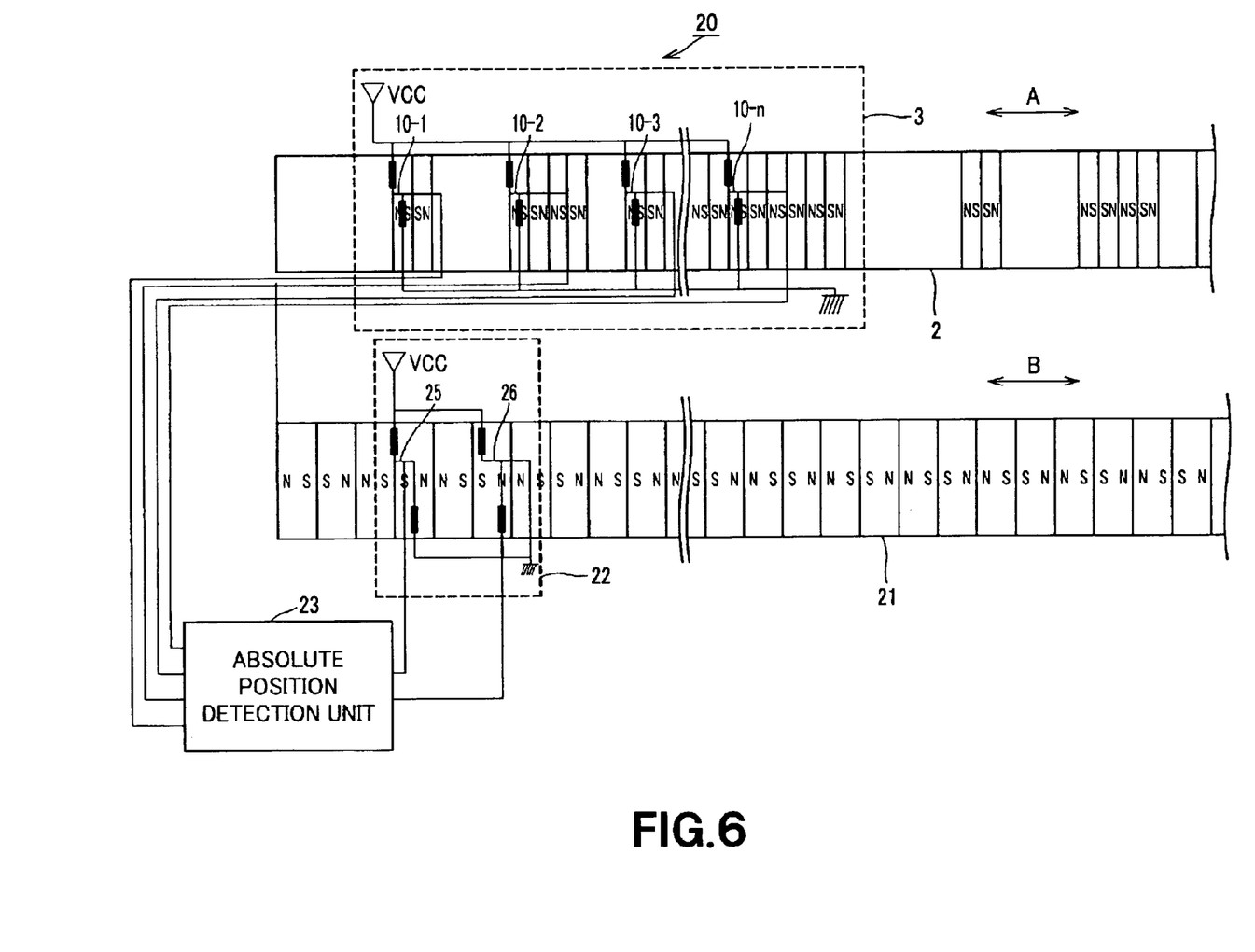
FIG. 6 is a schematic view showing another position detection apparatus embodying the present invention.

Referring to FIG. 6, a position detection apparatus 20 includes an ABS track 2, an ABS detection unit 3, an incremental track, referred to below as an INC track 21, a detection unit for an INC track, referred to below as a INC track detection unit 22, and an absolute position detection unit 23.

Meanwhile, in the position detection apparatus 20, the same elements as those of the position detection apparatus 1 are depicted by the same reference numerals and, as for detailed explanation, reference is to be made to the corresponding explanation of the position detection apparatus 1.

The INC track 21 is of a magnetic pattern formed by alternate magnetization with the wavelength 2$\lambda$ and is juxtaposed to the ABS track 2.

The INC track detection unit 22 is provided for movement along the longitudinal direction of the INC track 21, indicated by arrow B. The INC track detection unit 22 is moved with movement of the ABS detection unit 3. The INC track detection unit 22 is provided with a head for a first incremental track, referred to below as a first INC head 25, and a second INC head 26. The first INC head 25 and the second INC head 26 are arranged with detection surfaces thereof facing and yet not contacting and facing the INC track 21.

The first INC head 25 and the second INC head 26 sense the information from the INC track 21. With the position detection apparatus 20, the absolute position detection unit 23 executes calculations, based on the information as sensed by the first INC head 25 and the second INC head 26, such that it may be grasped in which position of the micro-sized areas of the ABS track 2 the ABS heads 10-1 to 10-$n$ have sensed the information.

Figure 7:
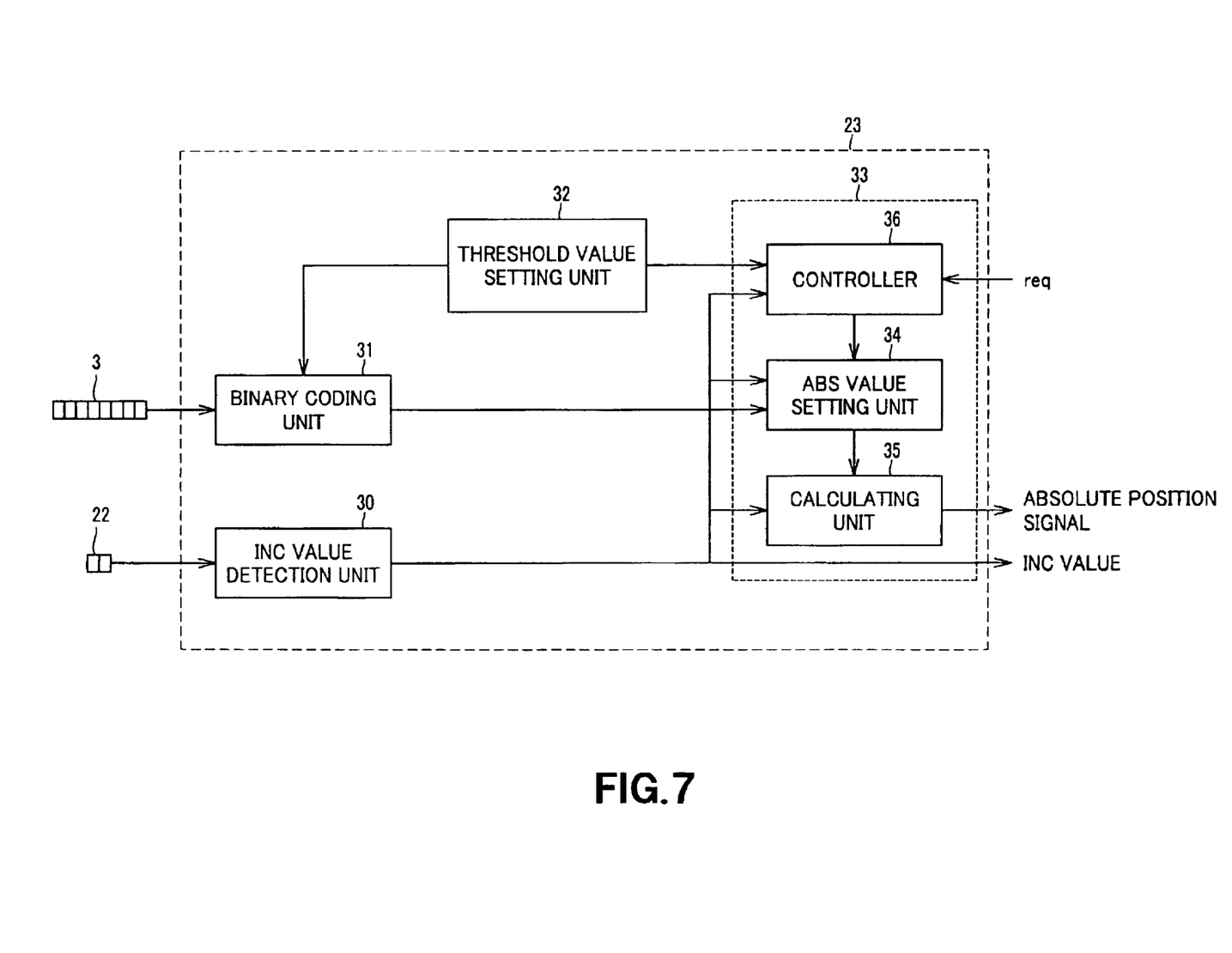
FIG. 7 is a block diagram showing an absolute position detection unit provided to the position detection apparatus.

Referring to FIG. 7, the absolute position detection unit 23 includes an INC value detection unit 30, a binary coding unit 31, a threshold value setting unit 32 and a control calculating unit 33. It should be noted that the absolute position detection unit 23 operates under the principle set forth in the Japanese Patent Application 2002-059256 filed in the name of the present Assignee.

Figure 8:
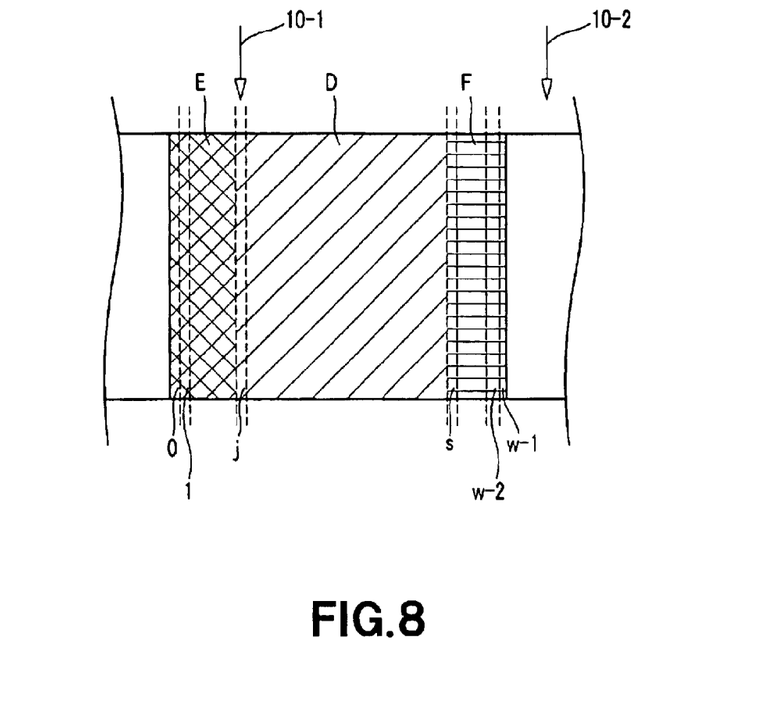
FIG. 8 is a schematic view for illustrating the INC value, stabilized area and first and second non-stabilized areas.

The INC value detection unit 30 detects INC values based on the information sensed by the first INC head 25 and the second INC head 26. The INC value indicates at which position of the micro-sized areas of the ABS track 2 the ABS heads 10-1 to 10-n have sensed the information. Referring to FIG. 8, the micro-sized areas are obtained by equally dividing the ABS track 2 into w areas, where w is a natural number, along the longitudinal direction of the ABS track 2. To the micro-sized areas, resulting from equal division by w, the INC values of 0, 1, 2, . . . , w−1 are accorded, beginning from one boundary side. In the present embodiment, the INC values of 0, 1, 2, . . . , w−1 are accorded in a direction proceeding from the ABS head 10-1 to the ABS head 10-2.

By introducing the INC value, it may be grasped that, if the INC value is not less than j and less than s, where j and s are natural numbers, with j<s<w, the ABS heads 10-1 to 10-n have sensed the information in the vicinity of the center of a micro-sized area of the ABS track 2 as indicated by a range D in FIG. 8. On the other hand, if the INC value is less than j, it may be grasped that the ABS heads 10-1 to 10-n have sensed the information in the non-stabilized area towards the zero INC value side in the micro-sized area of the ABS track 2 indicated by range E in FIG. 8. This non-stabilized area is herein termed the first non-stabilized area. If the INC value is not less than s, it may be grasped that the ABS heads 10-1 to 10-n have sensed the information in the non-stabilized area towards the w INC value side in the micro-sized area of the ABS track 2 indicated by range F in FIG. 8. This non-stabilized area is herein termed the second non-stabilized area. The values of j and s are set depending on the accuracy of the position detection apparatus 20 and information sensing characteristics of the ABS heads 10-1 to 10-n, first INC head 25 and the second INC head 26. It is noted that the INC values are determined by for example the method described in the Japanese Patent No. 2571394.

The binary coding unit 31 is constructed by e.g. a comparator and binary encodes the output of the ABS heads 10-1 to 10-n to [H] and [L] based on a threshold value. In the present embodiment, the output in excess of the threshold is [H], while the output below the threshold is [L]. The output larger than the threshold value and that not larger than the threshold value may be set to [H] and [L], respectively. The [H] and [L], as defined above, may also be reversed.

With the binary coding unit 31, the threshold value in binary coding is varied with the INC value. When the INC value is not less than j and less than s, that is when the ABS heads 10-1 to 10-n are facing the stabilized area, the binary coding unit 31 binary encodes the outputs of the ABS heads 10-1 to 10-n with a as a threshold value. When the INC value is less than j or not less than s, that is when the ABS heads 10-1 to 10-n are facing the first or second non-stabilized area, the binary coding unit 31 binary encodes the outputs of the ABS heads 10-1 to 10-n with h as a threshold value, or binary encodes the outputs of the ABS heads 10-1 to 10-n with l as a threshold value, respectively. Meanwhile, a, h and l are natural numbers, with l<a<h.

The threshold value setting unit 32 sets the threshold value of the binary coding unit to any of a, h or l, under control by a controller, as later explained.

The control calculating unit 33 includes an ABS value setting unit 34, a calculating unit 35 and a controller 36.

The ABS value setting unit 34 includes a CPU (central processing unit), a RAM (random access memory) and a ROM, not shown. In this ROM, there are stored data showing the relationship between the ABS value as detected by the ABS detection unit 3 and the absolute position domain signal representing the position of the ABS detection unit 3 relative to the ABS track 2 in terms of a domain. The ABS value setting unit 34 first sets the ABS value based on the binary-coded data as obtained by the binary coding unit 31 and the INC value as determined by the INC value detection unit 30, and subsequently converts the ABS value into the absolute position domain signal in accordance with the data stored in the ROM. The method by which the ABS value setting unit 34 determines the ABS value differs depending on whether the INC value is not less than j and less than s or less than j or less than s. The method by which the ABS value setting unit 34 determines the ABS value will be explained later in detail.

The calculating unit 35 sums the INC value to the absolute position domain signal to output the resulting sum signal. By summing the INC value to the absolute position domain signal, there may be obtained an absolute position signal indicating the position of the ABS detection unit 3 relative to the ABS track 2 by 1/w precision of the absolute position domain signal.

The controller 36 controls the threshold value setting unit 32 and the ABS value setting unit 34. For example, the controller 36 actuates the threshold value setting unit 32 and the ABS value setting unit 34 based on an ABS value detection command signal, supplied from outside, as indicated by req. The controller 36 also controls the threshold value, which the threshold value setting unit 32 sets for the binary coding unit 31, based on the INC value. Specifically, when the INC value is not less than j and less than s, the ABS value setting unit 34 sets the threshold value of the binary coding unit 31 to a and, when the INC value is less than j or not less than s, the ABS value setting unit 34 sets the threshold value of the binary coding unit 31 to h. After the end of the binary coding in which the binary coding of setting h as the threshold value, the threshold value of the binary coding unit 31 is set to l. Additionally, the controller 36 controls the operation of the ABS value setting unit 34 depending on whether the INC value is not less than j and less than s, less than j or not less than s.

The method by which the ABS value setting unit 34 determines the ABS value to convert the ABS value into the absolute position domain signal is now explained in detail.

In the following explanation, the ABS detection unit 3 detects the contents of the 4-bit code by the ABS detection unit 10-1 detecting the 0'th bit, the ABS detection unit 10-2 detecting the first bit, the ABS detection unit 10-3 detecting the second bit and by the ABS detection unit 10-3 detecting the third bit.

When the INC value is not less than j and less than s, it may be conjectured that the ABS heads 10-1 to 10-n are in the stabilized area, such that the ABS value has been correctly detected by the ABS detection unit 3. Thus, the ABS value setting unit 34 verifies that the ABS detection unit which has determined the output signal of the binary coding unit 31 to be [H] has output a signal [1], while verifying that the ABS detection unit which has determined the output signal of the binary coding unit 31 to be [L] has output a signal [0]. The n-bit code, obtained as a result of converting [H] and [L] to [1] and [0], respectively, is taken to be an ABS value. This ABS value is converted into the absolute position domain signal based on the data indicated in the ROM.

On the other hand, if the INC value is less than j, it may be conjectured that the ABS heads 10-1 to 10-n are in the first non-stabilized area, whereas, if the INC value is not less than s, the ABS heads 10-1 to 10-n are in the second non-stabilized area. Thus, if the INC value is less than j, the ABS value setting unit 34 executes the processing as now explained.

First, the ABS value setting unit 34 compares the result of binary coding with h as the threshold value to that with l as the threshold value. The ABS value setting unit 34 determines the bit as detected by the ABS head and as verified to be [H] both on binary coding with h as the threshold value and on binary coding with l as the threshold value, as being [H], and hence verifies the bit to be [1]. Additionally, the ABS value setting unit 34 as determines the bit detected by the ABS head and as verified to be [L] both on binary coding with h as the threshold value and on binary coding with l as the threshold value, as being [L] and hence verifies the bit to be [0].

The ABS head, which has detected the bit determined to be [H] or [L], outputs a stable signal even in the first non-stabilized area or in the second non-stabilized area. In two neighboring bits which are of different codes, it may be conjectured that the signal output by the ABS detection unit in the first or second non-stabilized area is necessarily unstable. Thus, at least one of two bits neighboring to a bit determined to be [H] or [L] is of the same code as the latter bit. Stated differently, if a bit is determined to be [H], at least one of two bits neighboring to the so determined bit is retained to be [H], with the so determined [H] bit being consecutive to the bit retained to be [H]. In similar manner, if a bit is determined to be [L], at least one of two bits neighboring to the so determined bit is retained to be [L], with the so determined [L] bit being consecutive to the bit retained to be [L].

A bit not verified to be [H] nor [L] is thought to be an inverted bit different in code from at least one of two bits neighboring to the bit not verified to be [H] nor [L].

Figure 9:
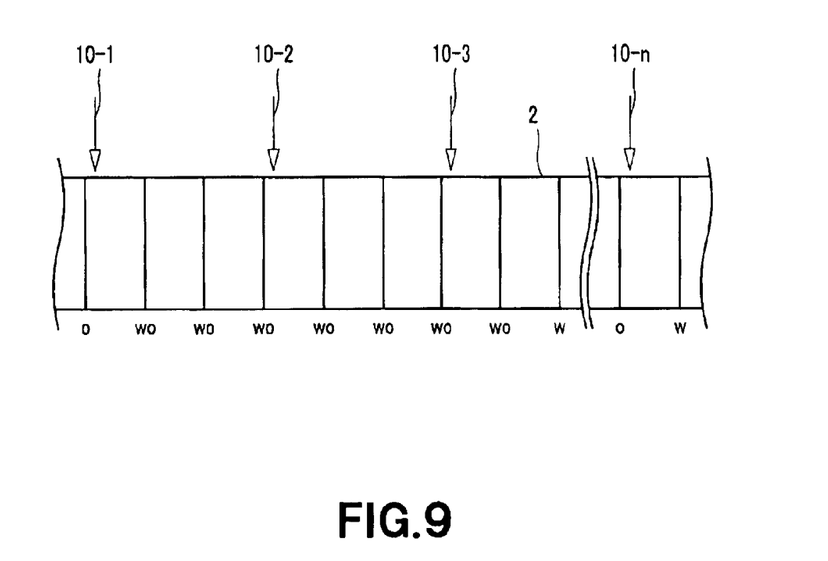
FIG. 9 is a schematic view showing the state in which each ABS head is detecting a magnetic field on the zero INC value side.

If the INC value is less than j, the ABS heads 10-1 to 10-$n$ is detecting the information in the first non-stabilized area. Referring to FIG. 9, when the information has been detected in the first non-stabilized area, the information detected by each ABS detection unit is affected by the neighboring micro-sized area towards the zero INC value side, that is the micro-sized area indicating the bit lower by one order, referred to below as the lower order bit. If the ABS detection unit detects the [0] signal in a state it is affected by the micro-sized area indicating the lower order bit, the micro-sized area indicating the lower order bit is also thought to be the micro-sized area indicated by [0]. On the other hand, if the ABS detection unit detects the [1] signal in a state it is affected by the micro-sized area indicating the lower order bit, the micro-sized area indicating the lower order bit is also thought to be the micro-sized area indicated by [1]. Thus, when the INC value is less than j, the lower order bit of the two consecutive H bits is determined to be [H], while the lower order bit of the two consecutive L bits is determined to be [L].

The ABS value setting unit 34 determines those remaining undetermined bits, neighboring to the bits determined to be [H] and which have not been determined to be [H] nor [L], as being [L], while also determining those remaining undetermined bits, neighboring to the bits determined to be [L] and which have not been determined to be [H] nor [L], as being [H]. The ABS value setting unit sequentially executes this processing to determine all bits to be [H] or [L].

Finally, the ABS value setting unit 34 converts [H] and [L] to [1] and [0], respectively, to yield an ABS value. The ABS value setting unit 34 converts the ABS value into the absolute position domain signal, based on data indicated in the ROM.

Figure 10:
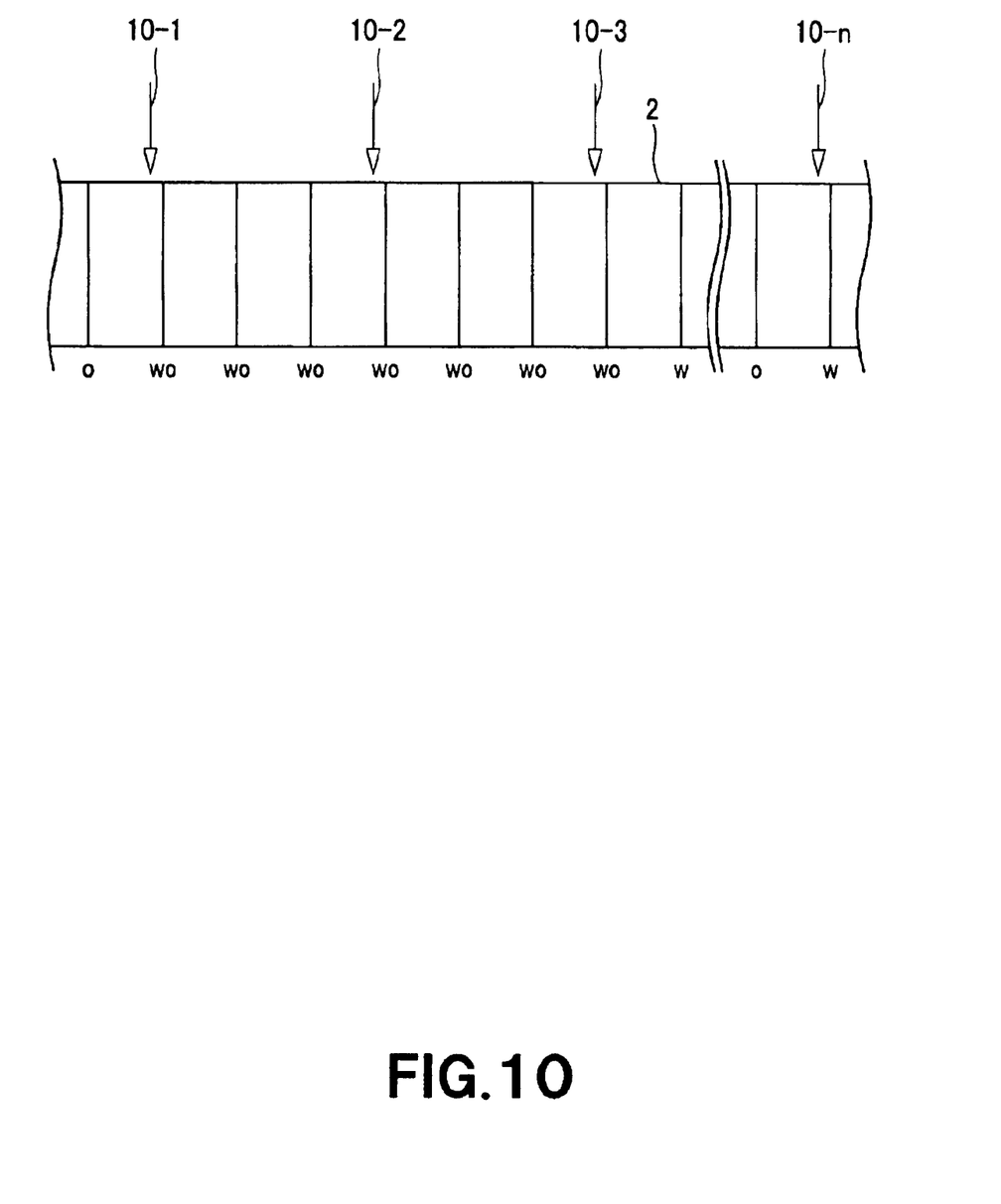
FIG. 10 is a schematic view showing the manner in which each ABS head is detecting the magnetic field on the w INC value side.

On the other hand, if the INC value exceeds s, the ABS heads 10-1 to 10-$n$ detects the information in the second non-stabilized area. Referring to FIG. 10, when the ABS head is detecting the information in the second non-stabilized area, the information detected by the ABS head is affected by the micro-sized area neighboring to the side w of the INC value, that is the micro-sized area indicating the bit higher by one order, referred to below as the higher order bit. When the ABS head is outputting the [0] signal under the influence of the micro-sized area indicating the higher order bit, the micro-sized area indicating the higher order bit also may be thought of as being a micro-sized area indicating [0]. On the other hand, when the ABS head is outputting the [1] signal under the influence of the micro-sized area indicating the higher order bit, the micro-sized area indicating the higher order bit also may be thought of as being a micro-sized area indicating [1]. Thus, when the INC value is less than j, the upper order bit of two consecutive H bits is determined to be [H], while the upper order bit of two consecutive L bits is determined to be [L]

The ABS value setting unit 34 determines those bits, neighboring to the bits determined to be [H] and which have not been determined to be [H] nor [L], as being [L], while also determining those bits, neighboring to the bits determined to be [L] and which have not been determined to be [H] nor [L], as being [H]. The ABS value setting unit sequentially executes this processing to determine all bits to be [H] or [L].

Finally, the ABS value setting unit 34 converts [H] and [L] to [1] and [0], respectively, to yield an ABS value. The ABS value setting unit 34 converts the ABS value into the absolute position domain signal, based on data indicated in the ROM.

Figure 11:
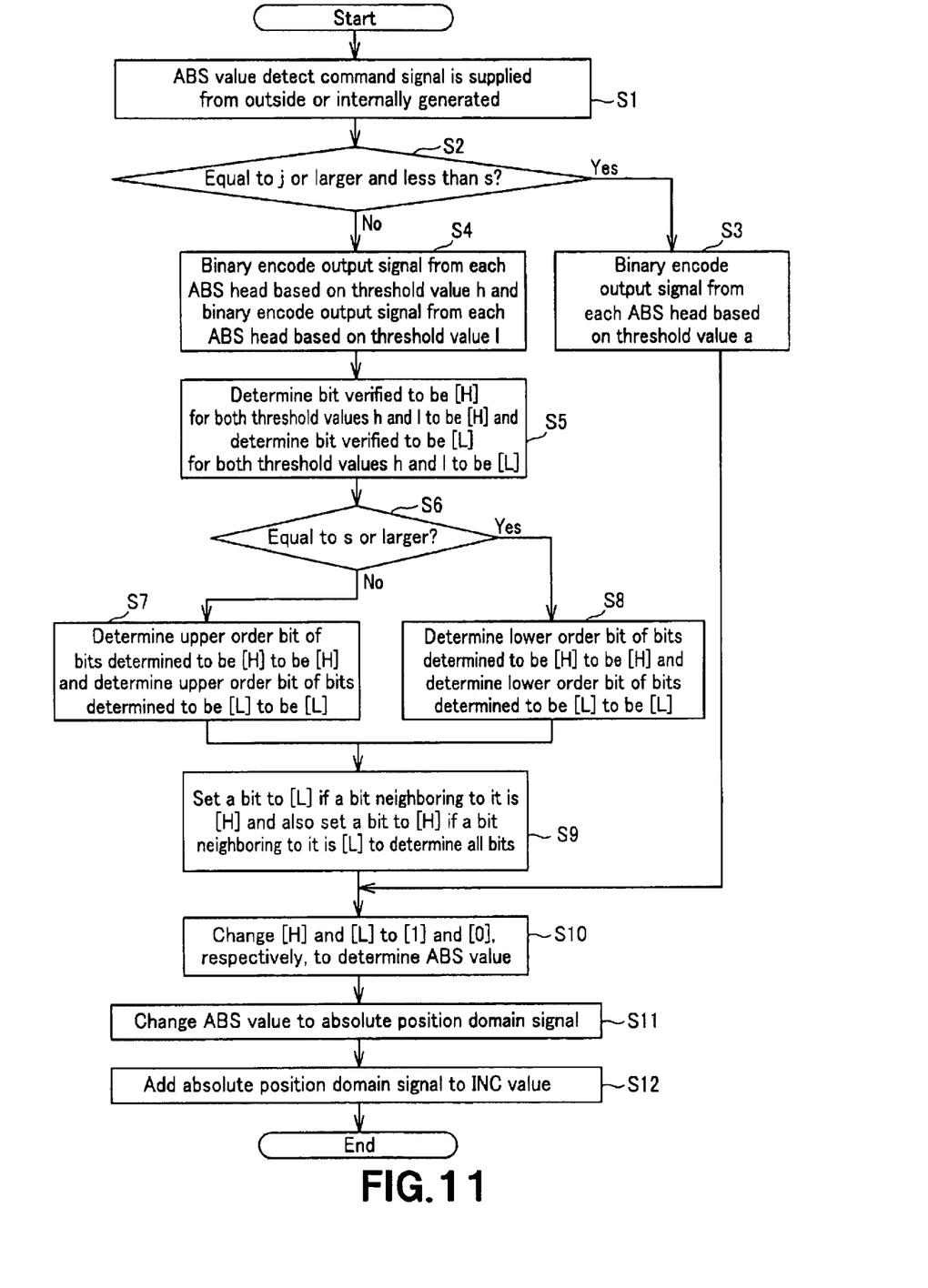
FIG. 11 is a flowchart illustrating the operation of a position detection apparatus embodying the present invention.

The above-described operation of the position detection apparatus 20 is hereinafter explained with reference to FIG. 11.

First, in a step S1, an ABS value detection command signal is given from outside to the controller 36, or an ABS value detection command is issued in the inside of the controller 36.

In the next step S2, the controller 36 determines whether or not the INC value determined by the INC value detection unit 30 is not less than j and less than s. If the INC value is not less than j and less than s, the controller proceeds to a step S3 and, if otherwise, to a step S4.

In the step S3, the threshold value setting unit 32 sets the threshold value of the binary coding unit 31 to a. The binary coding unit 31 binary encodes the signal, output from the ABS heads 10-1 to 10-$n$, to binary values of [H] and [L].

In a step S4, the binary coding unit 31 encodes the signal, output from the ABS heads 10-1 to 10-$n$, to binary values of [H] and [L], after the threshold value setting unit 32 has set the threshold value for the binary coding unit 31 to h. Moreover, the binary coding unit 31 encodes the signal, output from the ABS heads 10-1 to 10-4, to binary values of [H] and [L], after the threshold value setting unit 32 has set the threshold value for the binary coding unit 31 to l.

In a step S5, the ABS value setting unit 34 determines the bits, verified to be [H] with both the threshold values h and l, to be [H], while determining the bits, verified to be [L] with both the threshold values h and l, to be [L].

In the next step S6, it is checked whether or not the INC value is not less than s. If the INC value is not less than s, the controller proceeds to a step S7 and, if otherwise, that is if the INC value is less than j, the controller proceeds to a step S8.

In a step S7, the upper order bit of the bit determined to be [H] is determined to be [H], while the upper order bit of the bit determined to be [L] is determined to be [L], and processing then transfers to a step S9.

In a step S8, the lower order bit with respect to the bit determined to be [H] is determined to be [H], while the lower order bit with respect to the bit determined to be [L] is determined to be [L]. The controller then proceeds to a step S9.

In the step S9, the bits neighboring to the bits determined to be [H] and which have not been determined to be [H] not [L] are determined to be [L], while those neighboring to the bits determined to be [L] and which have not been determined to be [H] not [L] are determined to be [H]. In this manner, the totality of the bits are determined to be [H] or [L].

In the next step S10, the ABS value setting unit 34 converts [H] and [L] of the bits, produced in the steps S3, S7 and S8, to [1] and [0], respectively, to determine the ABS values.

In the next step S11, the ABS value setting unit 34 converts the ABS values into absolute position domain signals, based on data stored in the ROM.

In the next step S12, the calculating unit 35 sums the absolute position domain signals to the INC values.

In the above-described position detection apparatus 20, the ABS detection unit 3 is able to detect the ABS value accurately, even if the ABS heads 10-1 to 10-$n$ are present in the non-stabilized area, thus allowing detection of the position of the ABS detection unit 3.

Moreover, with the position detection apparatus 20, it is possible to interpolate additional micro-sized areas, thus allowing detection of the position of the ABS detection unit 3 with respect to the ABS track 2 with higher resolution.

The foregoing description has been made with reference to a case in which the present invention is applied to a magnetic position detection apparatus. The present invention, however, is also applicable to a position detection apparatus other than the magnetic position detection apparatus. For example, the present invention is applicable to an optical position detection apparatus or to a capacitative position detection apparatus.

What is claimed is:

1. A position detection apparatus comprising:

an absolute track composed of a string of a number of micro-sized areas each indicated by a code of [0] and a number of micro-sized areas each indicated by a code of [1], in accordance with a maximum length sequence generated by a degree-n primitive polynominal, n being a natural number not less than 2, said micro-sized areas each indicated by a code of [1] differing in physical properties from said micro-sized areas each indicated by a code of [0]; and a detection unit for said absolute track movable relative to said absolute track, said detection unit including n heads for said absolute track, arrayed facing said absolute track, for detecting the physical properties of said absolute track; wherein said n heads for said absolute track are arrayed under a condition satisfying the equations 1 and 2 if n is an even number and under a condition satisfying the equations 1 and 3 if n is an odd number:

$$\lambda_1 = m\lambda, \text{ m being an integer not less than 2} \quad (1)$$

$$\lambda_1 \neq k(2^{n/2}+1)\lambda, \text{ k being a natural number} \quad (2)$$

$$\lambda_1 \neq k(2^n+1)\lambda \quad (3)$$

where $\lambda$ is a pitch of said micro-sized areas and $\lambda_1$ is the separation between neighboring ones of said n heads for said absolute track.

2. The position detection apparatus according to claim 1 wherein the length Lt of said absolute track satisfies the equation 4:

$$Lt > (2^n-1)\lambda + (n-1)\lambda_1 \quad (4).$$

3. The position detection apparatus according to claim 1 further comprising:

an incremental track having physical properties thereof changed at a constant period; and a detection unit for said incremental track, including a head for said incremental track, arranged facing said incremental track, for detecting physical properties of said incremental track.

* * * * *